OSWALD KUBATSCHKA
KLAUS-JÜRGEN SCHULZE
*INVENTORS*

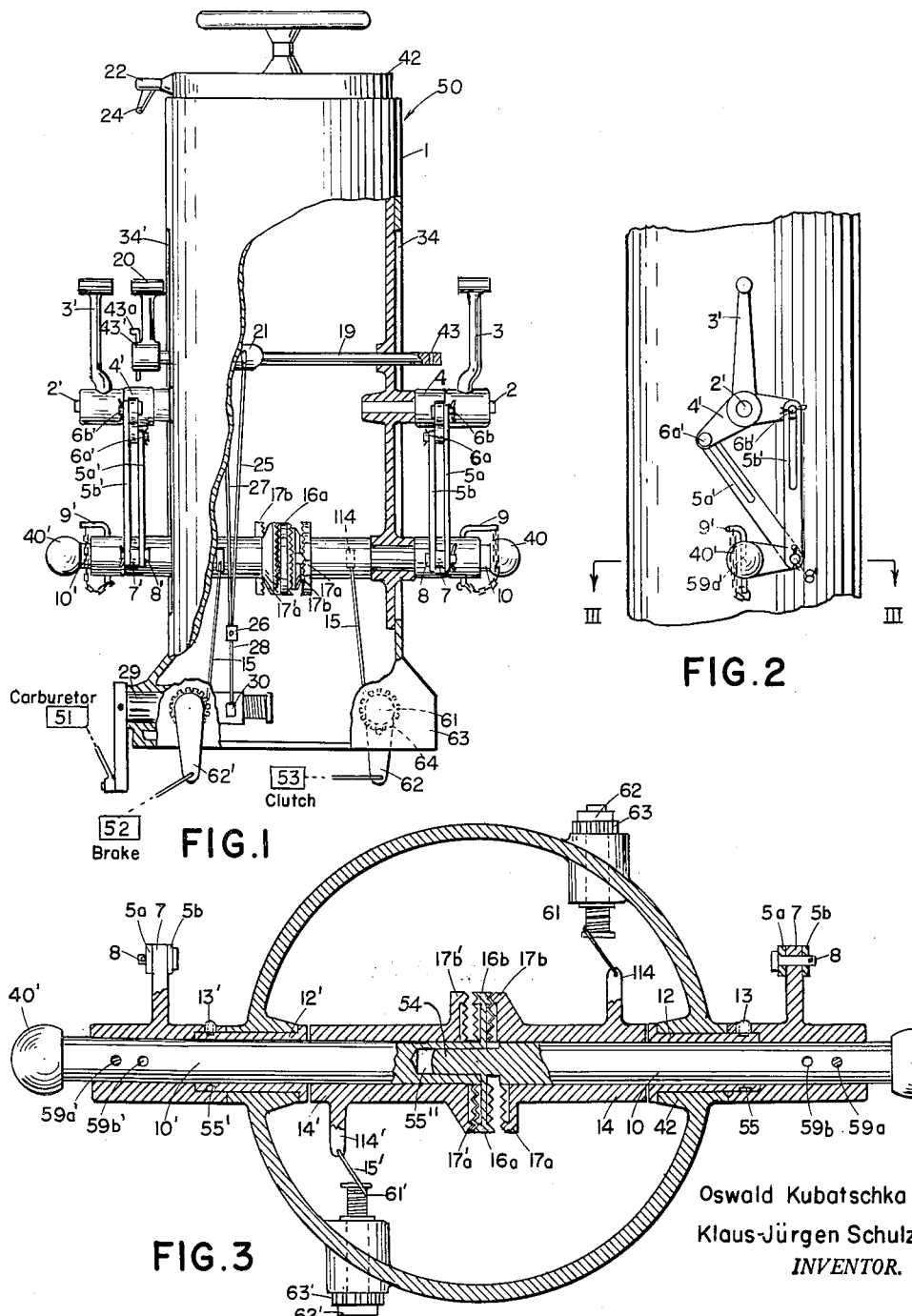

BY

AGENT

Feb. 20, 1962   KLAUS-JÜRGEN SCHULZE ET AL   3,021,720
CONTROL DEVICES FOR ADJUSTABLE DRIVING MOUNTS
Filed June 24, 1959   3 Sheets-Sheet 3

Oswald Kubatschka
Klaus-Jürgen Schulze
INVENTORS.

BY

AGENT.

United States Patent Office 3,021,720
Patented Feb. 20, 1962

3,021,720
CONTROL DEVICES FOR ADJUSTABLE
DRIVING MOUNTS
Klaus-Jürgen Schulze and Oswald Kubatschka, Nordhausen, Germany, assignors to VEB Schlepperwerk Nordhausen, Nordhausen (Harz), Germany, a corporation of Germany
Filed June 24, 1959, Ser. No. 822,599
Claims priority, application Germany July 7, 1958
20 Claims. (Cl. 74—481)

Our present invention relates in general to driving mounts, and more specifically to reversible driving mounts as described in co-pending application Ser. No. 778,031, filed December 3, 1958 by Henry Selle and Klaus-Jürgen Schulze, now Patent No. 2,987,936, on which there are supported the various controls to operate a tractor, a combine or a similar automotive vehicle. More particularly this invention relates to the various controls for the clutch, the brake and the accelerator of such a vehicle which are carried on a reversible and, if desired, extensible turret.

Adjustable driving mounts of this type have heretofore been provided with controls such as a brake pedal and a clutch pedal which were single-purposed in that, while they could be used from either side of a mount, they were not interchangeable. Moreover, in any reversible driving mount the order of the clutch and brake pedals becomes reversed when the driver's position is rotated through 180° about the driving mount. This reversal of the normal order of the controls relative to the driver may seriously interfere with proper handling of the vehicle. To remedy this inconvenience, it has previously been proposed to provide the turret with parallel brake and clutch shafts whose opposite extremities, e.g. as disclosed in co-pending application Ser. No. 726,925 filed April 7, 1958 by Karl Wehsely and Gottfried Haase, now Patent No. 2,984,311, accommodated a pair of pedals interchangeably serving as either clutch-control or brake-control members. The present invention aims at simplifying the operations necessary for changing from one driver's position to the other while preserving the relative arrangement of at least the major controls.

A further object of this invention is the provision of simplified means for adapting the aforementioned controls to different elevations of a vertically adjustable driving mount.

The foregoing objects are realized, in accordance with an important feature of our invention, by the provision of a control shaft and a controlled shaft, a pair of oppositely extending arms on the control shaft and a further arm on the controlled shaft, the controlling arms forming part of a triangular linkage by being both connected with the same extremity of the controlled arm through a pair of links which are resistant to linear deformation in one sense only, as by being substantially inextensible but slackenable, whereby either link will be effective, depending upon the sense of rotation of the control shaft, to rotate the controlled shaft in an invariable direction against a counteracting force such as the tension of a restoring spring. The unidirectionally deformation-resistant links may be represented, for example, by rigid bars with a lost-motion (e.g. pin-and-slot) connection at either end, or by flexible elements such as wires or chains. The last-mentioned solution is particularly advantageous where it is desired to adjust the elevation of a driving mount supporting the controlling shaft, the variable distance between the two shafts being then readily compensable by changes in the effective length of the flexible elements. For this purpose it will be convenient, in accordance with another feature of this invention, to provide a flexible extension for these elements adapted to be wound one or more times about the controlled shaft, advantageously in conjunction with a releasable connection between the last-mentioned shaft and a member to be actuated by it whereby the shaft may be rotated the necessary number of times in a link-slackening or link-tightening sense before the said connection is reestablished.

Pursuant to a more specific feature of our invention, duplicate controlling and controlled shafts are provided and the two controlled shafts are each adapted to be selectively coupled with either of two responsive devices, such as a brake-control member and a clutch-control member, whereby each control shaft may be connected to displace either of the responsive devices in a predetermined direction regardless of the sense of rotation of such shaft. This, in turn, enables the fixed positioning of a pair of actuating levers (e.g. pedals) on opposite sides of a driving mount, with only a minor adjustment required to bring about the desired change in connection.

Although any mechanical, electrical or hydraulic means known per se could be used for selectively coupling the controlled shafts with their responsive devices, we have found the provision of jaw clutches for this purpose to be particularly advantageous. In a preferred embodiment, in which the two controlled shafts are coaxially aligned, complementary clutch segments are provided on these shafts and on a pair of sleeves freely rotatable thereabout, a slight axial shift of each of these shafts being sufficient to disengage it from its own sleeve while operatively connecting it with the sleeve of the other shaft. In an intermediate position, i.e. upon being disengaged from both sleeves, the shaft may also be rotated through a small angle to enable a more convenient adjustment of the associated pedal so as to accommodate a driver facing either the front or the rear of the vehicle.

The above and other objects, advantages, and features of our invention will become more fully apparent from the following description and the accompanying drawings wherein:

FIG. 1 is a front-elevational view, partly in section, of a driving mount provided with control levers according to our invention;

FIG. 2 is a side-elevational view of a detail of FIG. 1;

FIG. 3 is a cross-sectional view taken along line III—III of FIG. 2;

Figure 3A:
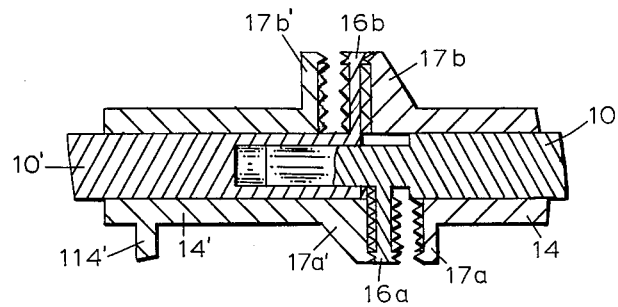
FIGS. 3A and 3B are detail views of the clutch elements of FIG. 3, drawn to enlarged scale, in two extreme positions.

In the drawing we show an adjustable driving mount or turret 50 having an outer casing 1 and an inner casing 42 slidably mounted to telescope vertically within it; in casing 42 are journaled control shafts 2, 2', an accelerator-pedal shaft 19, an accelerator-lever shaft 22 and intermediate controlled shafts 10, 10'. The shafts 2, 2', 19, 10, 10', which are raised and lowered with inner casing 42, pass through vertical slots 34, 34' formed on both sides of outer casing 1. Shaft 22 carries a manually operable accelerator lever 24 while a gas pedal 20 is removably mounted on shaft 19 by a pin 43. A double-arm lever 21 is ridily secured to shaft 19 and operatively connected by cables 25a, 25b to a junction 26 which is further connected by an extension cable 28 to an inner arm 30; the latter is operatively coupled via a sleeve 29, journaled in outer casing 1, and an outer rotating lever 33, secured to that sleeve, to a fuel-control device such as a carburetor 51. Brake- and clutch-control levers in the form of pedals 3, 3' are rigidly secured to shafts 2, 2', respectively, upon which double-arm levers 4, 4' are respectively mounted. Slotted bars 5a, 5b, slidably engaged by pins 6a, 6b on the extremities of lever 4, and slotted bars 5a', 5b', coupled by a similar lost-motion connection with lever 4', are articulated to levers 7, 7' by studs 8, 8', respectively. Levers 7, 7' are angularly displaceable together with the shafts 10, 10' to which they are respectively secured by removable pins 9, 9'. Shafts 10, 10' are surrounded by respective transmission sleeves 14, 14' with fingers 114, 114' from which cables 15, 15' lead to respective take-up drums 61, 61' whose shafts carry a pair of lever arms 62, 62' which are respectively connected to a brake member 52 and to a clutch member 53. Positive coupling between drums 61, 61' and arms 62, 62' is effected by respective pins 64 which are removably positioned on these arms for engagement with the teeth of respective pinions 63, 63' on the shafts of drums 61, 61'.

Figure 3B:
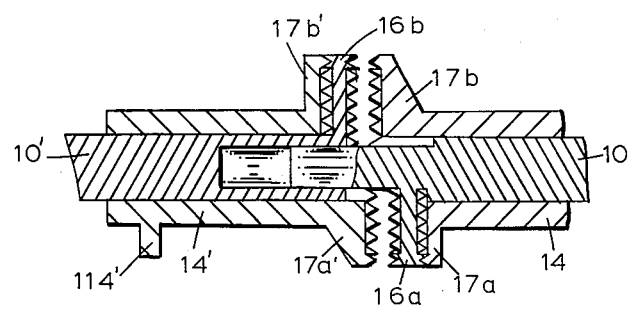

FIGS. 2 and 3 illustrate in further detail the clutch lever 3 and its assembly. Shaft 10 is provided with an extension 54 insertable into a bore 55 of aligned shaft 10'. Shafts 10, 10' are axially and angularly displaceable within bushings 12, 12', respectively, which are rigidly secured to inner casing 42. Levers 7, 7' are restrained from axial displacement by set screws 13, 13' which engage annular grooves 55, 55' in the respective bushing 12, 12'. Removable pins 9, 9' are each selectively insertable into a respective pair of axially spaced bores 59a, 59a' and 59b, 59b', thereby interconnecting the levers 7, 7' with the shafts 10, 10', respectively, in two axial positions of the shafts. The independently rotatable transmission sleeves 14, 14' on shafts 10 and 10' are provided with jaw-clutch segments 17a, 17b and 17a', 17b'; segments 17a, 17a' are alternately engageable with a complementary jaw-clutch segment 16a on shaft 10', whereas segments 17b, 17b' are alternately engageable with a complementary jaw-clutch segment 16b on shaft 10. More particularly, it will be seen from FIGS. 3A and 3B that clutch segment 16b is a flanged portion of shaft 10' and is axially displaceable for the selective engagement of one of its clutch faces with the clutch segment 17b of sleeve 14 or the other of its faces with the clutch segment 17' of sleeve 14'. Similarly, the double-faced clutch segment 16a which is formed as part of the shaft 10 is axially displaceable for selective engagement either with the clutch segment 17a' of sleeve 14' or with the clutch segment 17a of sleeve 14.

In the axial position of the shafts 10, 10' shown in FIG. 3, when it is desired to apply the clutch, pedal 3 is displaced angularly about shaft 2 in either direction, thereby rotating lever 7 and shaft 10 in a counterclockwise direction; shaft 10 entrains transmission sleeve 14' on shaft 10 and causes it to tension the cable 15' leading to the clutch 53. In an analogous manner, brake 52 is actuated by the displacement of lever 3'. When the direction of travel is reversed and it is desired to switch the functions of the two pedals 3, 3', pins 9, 9' are removed from bores 59a, 59a', respectively, shafts 10, 10' are displaced axially by means of knobs 40, 40' in an outward direction to a second axial position in which their bores 59b, 59b' register with the bores of levers 7, 7', and pins 9, 9' are inserted to reconnect these levers with their associated shafts. In this second position, shaft 10' is operatively coupled with sleeve 14 rotatable on that shaft. Thus when pedal 3' is displaced, clutch 53 is actuated in the manner described. Similarly, pedal 3 operates brake 52 in the second axial position of shaft 10 through its coupling with sleeve 14'.

Figure 4:
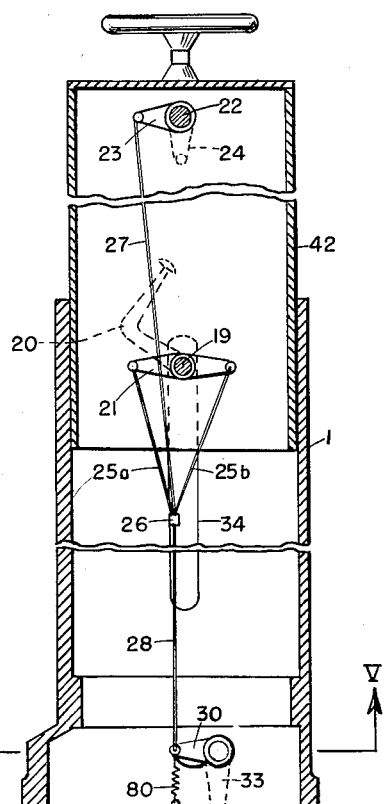
FIG. 4 is a cross-sectional view of another detail of FIG. 1.
Figure 5:
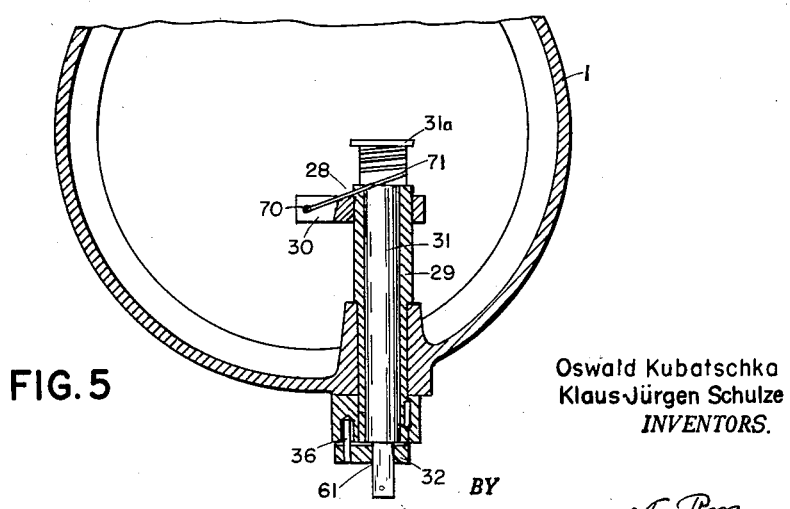
FIG. 5 is a cross-sectional view taken along line V—V of FIG. 4.

FIGS. 4 and 5 show how an arm 23 on the auxiliary accelerator-control shaft 22, journaled in casing 42, is attached to the cable 27 which joins the cables 25a, 25b at junction 26. An extension cable 28 interconnects junction 26 and inner arm 30. Cable 28 passes through a bore 70 in arm 30 and is further secured to a take-up drum 31a on an extremity of a shaft 31. Inner arm 30 is rigidly secured to sleeve 29 and operatively secured to arm 33 which is fastened by conventional means to the carburetor 51. Shaft 31 is further provided with an axially slidable crank 32 equipped with a locking pin 36 insertable into arm 33. A restoring spring 80 is anchored to inner arm 30 and to the base of the driving mount.

When accelerator lever 24 or 20 is displaced, cables 25a, 25b, 27, 28 transmit the displacement via arm 30, sleeve 29 and arm 33 to the carburetor 51. If, to reverse the direction of travel of the vehicle, the driver's seat is to be rotated into the new direction, the position of the accelerator pedal 20 on shaft 19 can be readily changed by the withdrawal of a pin 43a which fits into a bore 43 or 43' at opposite ends of the shaft.

When the telescoping inner casing 42 of the driving mount is raised or lowered, it is only necessary to shift the crank 32 axially on the profiled extremity of shaft 31, thereby withdrawing pin 36 from its recess in lever arm 33, to rotate shaft 31 with take-up drum 31a in a manner so as to provide the requisite amount of cable slackening or tightening to compensate for the vertical adjustment of the driving mount, and to relocate crank 32 so as to consolidate lever 33 with that take-up drum.

Manually operable lever 24, although shown fixed in one position, may be equipped with a double-arm lever, similar to the one shown at 21, if it is desired to position it alternately on opposite sides of the driving mount.

The function of capstans 61 and 61' is analogous to that of drum 31a in that they, too, can be rotated (upon the withdrawal of the respective pin 64) to impart the proper tension to cable 15 or 15' during any adjustment of the elevation of the mount. It will be understood that the devices controlled thereby, i.e. brake 52 and clutch 53, are provided in the usual manner with restoring springs (not shown) serving to keep these cables properly tensioned, in the same way as cable 28 is maintained under tension by the spring 80.

It will be readily understood that the embodiment described and shown has been given solely for purposes of illustration and that modifications in the construction, arrangement and combination of parts may be made without departing from the spirit of the invention except as it may be more particularly limited in the appended claims.

We claim:

1. A driving mount for automotive vehicles, comprising a support, a control shaft on said support, operating means for rotating said shaft in either direction, a double-arm lever member on said shaft, a rotatable member spaced from said shaft, coupling means operatively connecting said rotatable member with a load to be controlled by said operating means, and two unidirectionally deformation-resistant links extending from opposite ends of said lever member toward said rotatable member and engaging the latter at substantially the same location, thereby translating rotation of said lever member in either sense into a rotation of said rotatable member in an invariable direction.

2. A driving mount according to claim 1 wherein said links comprise a pair of rigid bars each provided with a lost-motion connection to at least one of said members.

3. A driving mount according to claim 2 wherein each of said bars is provided with a slot, each end of said lever being provided with a pin engaging the slot of a respective bar.

4. A driving mount according to claim 1 wherein said links comprise a pair of flexible wires.

5. A driving mount according to claim 1 wherein said support comprises a pair of relatively displaceable portions respectively carrying said lever member and said rotatable member, said links including flexible wire means, said rotatable member being provided with an extension adapted to have a variable part of said wire means wound thereon for maintaining said wire means taut in different relative positions of said portions.

6. A driving mount according to claim 1 wherein said shaft is provided with two free extremities, said operating means comprising a pedal selectively positionable on either of said extremities.

7. A driving mount for automotive vehicles, comprising a pair of relatively displaceable supporting portions, a rotatable controlled shaft on the other of said portions, a flexible link interconnecting said shafts for simultaneous rotation in a predetermined direction, a first transmission member operatively coupled with said control shaft for imparting rotation thereto, a second transmission member operatively coupled with said controlled shaft for transmitting a rotation of the latter to a load, and a capstan on one of said shafts adapted to have part of said flexible link wound thereon, said capstan being releasably coupled with the respective transmission member for rotation independently thereof to adjust the effective length of said flexible link to the relative spacing of said shafts.

8. A driving mount according to claim 7 wherein said supporting portions are two generally cylindrical housings telescopically engaging each other.

9. A driving mount according to claim 8 wherein said housings have a substantially vertical axis, said shafts passing substantially horizontally through said housings.

10. A driving mount according to claim 9 wherein said control shaft is provided with extremities projecting at opposite sides from the associated housing, said first transmission member comprising a lever alternately positionable on either of said extremities.

11. A driving mount according to claim 10 wherein said capstan is provided on said controlled shaft, said control shaft being provided with a double-arm lever, said flexible link comprising three wires respectively extending from a common junction to said capstan and to the two ends of said lever, thereby translating rotation of said control shaft in either sense to a rotation of said capstan in an invariable direction.

12. A driving mount for automotive vehicles, comprising a support, a pair of axially aligned shafts projecting from opposite sides of said support, a pair of operating members respectively coupled with said shafts for independently rotating same, a pair of controlled members, and coupling means selectively actuatable to establish an operative connection between either of said controlled members and either of said shafts.

13. A driving mount according to claim 12 wherein said coupling means comprises a pair of independently rotatable transmission elements, a pair of first clutch halves on each of said shafts, a pair of complementary second clutch halves on each of said transmission elements, each of said first clutch halves being selectively engageable with a respective second clutch half, and link means connecting each transmission element to a respective controlled member.

14. A driving mount according to claim 13 wherein said transmission elements are a pair of sleeves respectively surrounding said shafts with freedom of relative motion, said pairs of first clutch halves being positioned with clearance between said pairs of second clutch halves, at least one set of pairs of corresponding clutch halves being axially staggered to enable operative coupling between each shaft and the associated sleeve in one relative axial position and between each shaft and the opposite sleeve in another relative axial position of said shafts and sleeves.

15. A driving mount according to claim 14 wherein said sleeves are axially fixed and each of said shafts is axially displaceable, further comprising locator means for maintaining each shaft in either of two axial positions relative to the respective sleeve.

16. A driving mount according to claim 15 wherein one of said shafts is provided with an axial bore, the other of said shafts having an axial projection slidably and rotatably received in said bore.

17. A driving mount according to claim 13 wherein said support comprises an upper housing portion and a lower housing portion of adjustable relative elevation, said shafts extending substantially horizontally in said upper housing portion, said controlled members being mounted on said lower housing portion, said link means comprising flexible wires and slack-adjusting means for maintaining said wires taut in different relative positions of said housing portions.

18. A driving mount according to claim 12, further comprising a pair of control shafts on said support substantially parallel to said aligned shafts, said operating members comprising a pair of lever arms, and a pair of triangular linkages respectively connecting said lever arms with said control shafts in a manner translating rotation of said control shafts in either sense into a rotation of the respective lever arms in an invariable direction.

19. A driving mount according to claim 18 wherein said control shafts project substantially horizontally from opposite sides of said support and are provided with respective pedals, further comprising a driver's seat positionable on opposite sides of said support within reach of both of said pedals.

20. A driving mount according to claim 19 wherein said controlled members respectively comprise a brake-actuating means and a clutch-actuating means.

References Cited in the file of this patent

UNITED STATES PATENTS

| | | |
|---|---|---|
| 629,385 | Romaine | July 25, 1899 |
| 2,358,094 | Panish | Sept. 12, 1944 |
| 2,411,500 | Bradley | Nov. 26, 1946 |
| 2,485,759 | Miller | Oct. 25, 1949 |
| 2,848,246 | Rub | Aug. 19, 1958 |